(12) United States Patent
Shor et al.

(10) Patent No.: US 10,999,083 B2
(45) Date of Patent: May 4, 2021

(54) DETECTING UNRELIABLE BITS IN TRANSISTOR CIRCUITRY

(71) Applicant: Birad—Research & Development Company Ltd., Ramat Gan (IL)

(72) Inventors: Joseph Shor, Tel Mond (IL); Yoav Weizman, Kfar Vitkin (IL); Yitzhak Schifmann, Bet Horon (IL)

(73) Assignee: Birad—Research & Development Corapany Ltd., Ramat Gan (IL)

( * ) Notice: Subject to any disclaimer, the term of this patent is extended or adjusted under 35 U.S.C. 154(b) by 0 days.

(21) Appl. No.: 16/689,264

(22) Filed: Nov. 20, 2019

(65) Prior Publication Data

US 2020/0092117 A1 Mar. 19, 2020

Related U.S. Application Data

(63) Continuation-in-part of application No. 15/694,809, filed on Sep. 3, 2017, now abandoned.

(51) Int. Cl.
| *H04L 9/32* | (2006.01) |
| *H03K 19/003* | (2006.01) |
| *G11C 11/417* | (2006.01) |
| *G06F 21/72* | (2013.01) |
| *G11C 11/412* | (2006.01) |

(52) U.S. Cl.
CPC ............ *H04L 9/3278* (2013.01); *G06F 21/72* (2013.01); *G11C 11/412* (2013.01); *G11C 11/417* (2013.01); *H03K 19/003* (2013.01); *H04L 2209/12* (2013.01)

(58) Field of Classification Search
CPC .................................................... G11C 11/417
See application file for complete search history.

(56) References Cited

U.S. PATENT DOCUMENTS

| 5,572,460 A | * | 11/1996 | Lien | .................... G11C 11/4125 257/E27.098 |
| 7,110,303 B2 | * | 9/2006 | Schubert | ................ G11C 29/50 365/189.16 |
| 9,279,850 B1 | * | 3/2016 | Pedersen | .............. H03K 19/003 |

* cited by examiner

*Primary Examiner* — Douglas King
(74) *Attorney, Agent, or Firm* — Dekel Patent Ltd.; David Klein

(57) ABSTRACT

A method for detecting unreliable bits in transistor circuitry includes applying a controllable physical parameter to a transistor circuitry, thereby causing a variation in a digital code of a cryptologic element in the transistor circuitry, the variation being a tilt or bias in a positive or negative direction. An amount of variation in the digital code of the cryptologic element is determined. Unreliable bits in the transistor circuitry are defined as those bits for which the variation is in a range defined as unreliable.

16 Claims, 5 Drawing Sheets

DETECTING UNRELIABLE BITS IN TRANSISTOR CIRCUITRY

CROSS-REFERENCE TO OTHER APPLICATIONS

This application is a continuation-in-part of, and claims priority from, U.S. patent application Ser. No. 15/694,809, filed Sep. 3, 2017.

FIELD OF THE INVENTION

The present invention relates generally to methods for detecting unreliable bits in transistor circuitry, particularly static random-access memory (SRAM) circuitry, which may have applications in increasing security of cryptologic elements in the circuitry, such as physical unclonable functions.

BACKGROUND OF THE INVENTION

The huge amount of sensing devices found in future cars/homes/workplaces/cities require a much stricter security requirement for identification and authentication. The Internet of Things (IoT) can become the "Internet of Threats" without proper security measures. Secured communication is required for all of the sensors and sensing hubs in IoT. It is essential that during hardware communication, the two parties are capable of identifying each other through secret keys and reliable authentication protocols. Trusted environment involves authentication or identification by another party and/or secure transition of private information after the data has been encrypted by a safe algorithm. The vast majority of secured interaction requires storing a secured key inside or at the vicinity of the secured hardware. For example, in the case of mobile devices in the medium to low level security hazards, the secret key in the prior art is stored by external nonvolatile memory. Beside the cost and power drawbacks of this approach it is extremely vulnerable to security attacks.

A technique which has recently emerged is the utilization of inherent semiconductor device mismatch to facilitate physical unclonable functions (PUFs). These PUFs are used to generate digital identifiers, unique to every chip, which are not even visible to the chip manufacturer. The quality of the security depends on the inherent uniqueness and reliability/controllability of these functions. The PUF relies on intrinsic undetectable manufacturing variations in the CMOS (complementary metal-oxide semiconductor) process. These are divided into two categories: local/random mismatches and global/systematic variations, such as process/voltage supply/temperature (PVT). Random mismatches come from stochastic atomic-level variations which cannot be controlled or predicted, and can be utilized to generate a unique digital identifier from the PUF structure. It is highly desirable that the PUF will be very sensitive to these local mismatches to give each element a maximized uniqueness/randomness. At the same time, PVT variations should not affect the PUF output, thus enabling high repeatability and reliability.

In the prior art, a variety of digital circuits have been used to generate PUFs. While these circuits are very sensitive to device variation, they are also vulnerable to noise and environmental effects, such as temperature, supply noise, device noise, etc. This has resulted in a limited reliability of the PUFs and error correction codes have been required to compensate for this, which exposes some of the secure information to the outside world. Among the different types of circuits used to generate PUF include delay lines and ring oscillators, but the most common PUF circuit is the SRAM (static random access memory) PUF.

A prior art SRAM PUF, which was recently reported (S. Mathew, et. al. "A 0.19 pJ/b PVT-Variation-Tolerant Hybrid Physically Unclonable Function Circuit for 100% Stable Secure Key Generation in 22 nm CMOS" in *ISSCC* 2014, *Digest of Technical Papers*, pp. 278) is shown in FIG. 1. When the cell is disabled, the SRAM latching nodes H and H_b are held at VCC by keeper transistors P2 and P3. A keeper transistor is a transistor which biases a node at a given level in a given state, such as a disable state. In FIGS. 1, P2 and P3 have this function. A virtual VSS, VssV, is generated by N1, and this is the Vss of the two criss-crossed latching inverters, iL and iR. The inverters are connected in a criss-cross or latching manner, such that the input of the first inverter is connected to the output of the second inverter and the input of the second inverter is connected to the output of the first inverter. When the cell is enabled, H and H_b are released and VssV is pulled down to Vss. The logical values of latch are mainly determined by the trip point variation between the two inverters. If there is a substantial amount of variation in a given cell, the latch will always reach the same logic value.

However, a problem can exist: If the variation is small, the logical value will be determined by noise, and can vary from run to run. In this case the bit is unstable and the PUF value from this bit is unreliable. In addition, this trip value for unstable bits can vary as a function of process, voltage and temperature conditions. According to S. Mathew, et. al., given no correction technique, 30% of the SRAM bits can be unstable. A temporal majority voting (TMV) method is suggested in S. Mathew, et. al., in which 20 multiple runs are done and bits which wake up in the same state 75% of the time are deemed valid. In addition, burn-in methods are used to solidify existing variation paths. Between these two techniques, only 6% of the array has unstable bits. Error correction codes are then used to make the PUF viable. The unstable bits can be masked by fusing or in the trusted environment and the algorithm can be implemented with the stable bits and error correction codes. However, the error correction code exposes some information to the outside world and is thus less secure.

A transient noise simulation of an unstable bit in the prior art is shown in FIG. 2, which consists of 100 orthogonal noise runs. During the initialization, both H and H_b are held at VCC. When the PUF cell is enabled, P2 and P3 release these nodes and they are both pulled towards VSS. Based on the noise and random variations in the bit, the latch can wake up in either state. If the random variation is large, the cell will consistently wake up in the same state. For this unstable cell shown in FIG. 2, the noise dominates and the cell can wake up in either state, which can present a reliability problem.

Thus, a need exists for a method for uncovering unstable bits in transistor circuitry, especially to achieve reliable SRAM PUF.

SUMMARY OF THE INVENTION

The present invention seeks to provide a method for uncovering unstable bits in transistor circuitry, as is described more in detail hereinbelow. The method has particular application in achieving reliable SRAM PUF. It is noted the methods of the invention may be used to achieve reliable use of any cryptologic elements in the circuitry, not just unclonable functions or features. A cryptologic element is any element in the circuitry which can be identified and evaluated but which is difficult to predict, and which can be used to provide a high level of confidence that only authorized access to the circuitry is possible.

In one embodiment, a tilting method (tilting refers to a variation in a positive or negative direction) is employed to expose the unstable bits, either in calibration or in the field. For example, for use with increasing reliability of PUFs, a biasing technique is applied to the PUF trip point, which pushes them in a given direction and forces them to trip. PUF bits which are very stable are resilient to this biasing and retain their original trip point. However, the unstable bits are tripped and can then be identified and eliminated from use. Different supply voltages may be applied to inverters in the circuitry, and/or keeper transistors in the circuitry, or to the entire PUF array (e.g., simultaneously) so that the size of the individual PUF bits is not significantly affected by the imposition of two supply levels.

In one embodiment, the PUF has at least one cell. The controllable physical parameter is capable of being tilted in one direction to bias the at least one cell to the zero state and is also capable of being tilted to bias the at least one cell to the one state. The at least one cell is considered a stable cell if when it is tilted an amount (e.g., without limitation, 30 mV, 50 mV, 70% or 80% or 90% of some other parameter) towards the zero state and tilted an amount towards the one state it does not change its state, and is considered an unstable cell if when it is tilted by an amount towards the zero or towards the one state, it changes its state in the direction of the tilting.

The tilting method may employ standard inverters or cascoded high-gain inverters, for example.

It is possible that even with the tilting some of the PUF cells can switch states for different input voltage (VCC) levels. This may be caused by increased speed of the transition which occurs at higher VCC levels. At very high speeds, the mismatch between the parasitic gate capacitances can become dominant in some of the cells and overcome the normal transconductance and Vt (threshold voltage) based mismatch. The parasitic capacitance effects can cause the cells to become unstable between corners. In order to eliminate these effects, a Miller capacitor may be placed between inputs of (criss-crossed) inverters of at least one of the PUF cells in the array. The presence of the Miller capacitor dominates any other parasitic effects and makes the effect of tilting more pronounced. It can be combined with tilting or can be implemented alone.

BRIEF DESCRIPTION OF THE DRAWINGS

The present invention will be understood and appreciated more fully from the following detailed description taken in conjunction with the drawings in which.

DETAILED DESCRIPTION OF EMBODIMENTS

Figure 1:
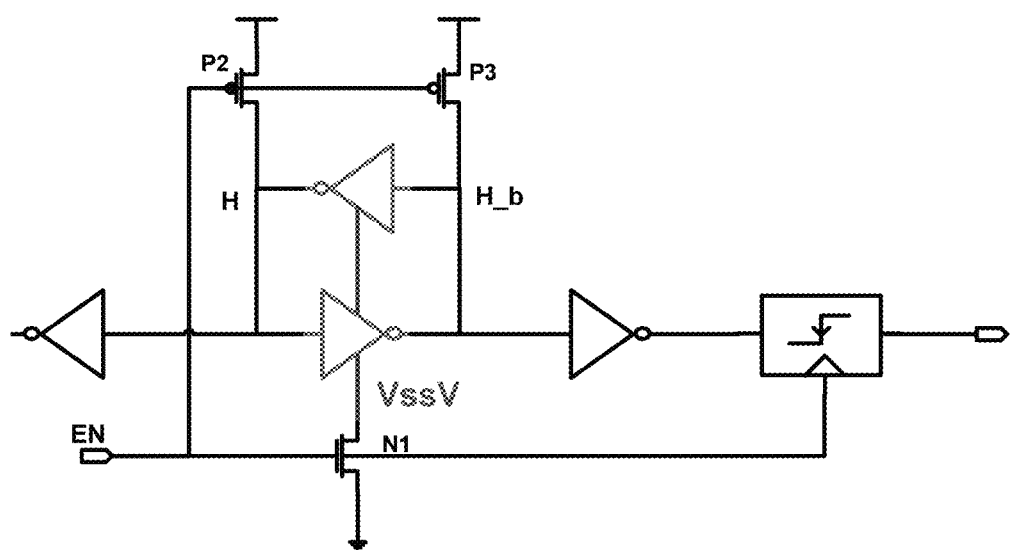
FIG. 1 is a circuit diagram of a prior art SRAM PUF.
Figure 2:
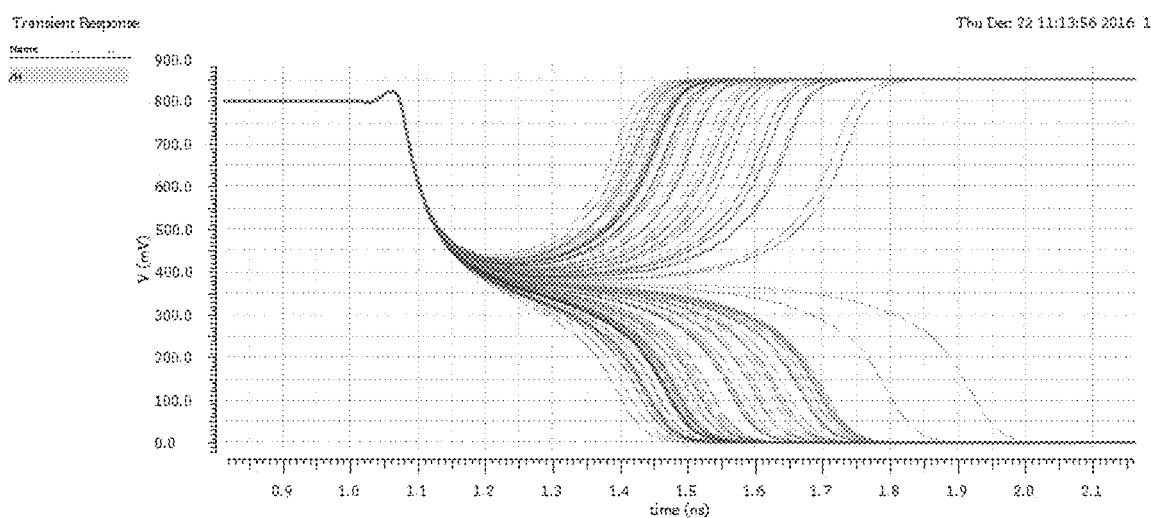
FIG. 2 is a graphical diagram of a transient noise simulation of a prior art unstable SRAM PUF bit after enable.
Figure 3A:
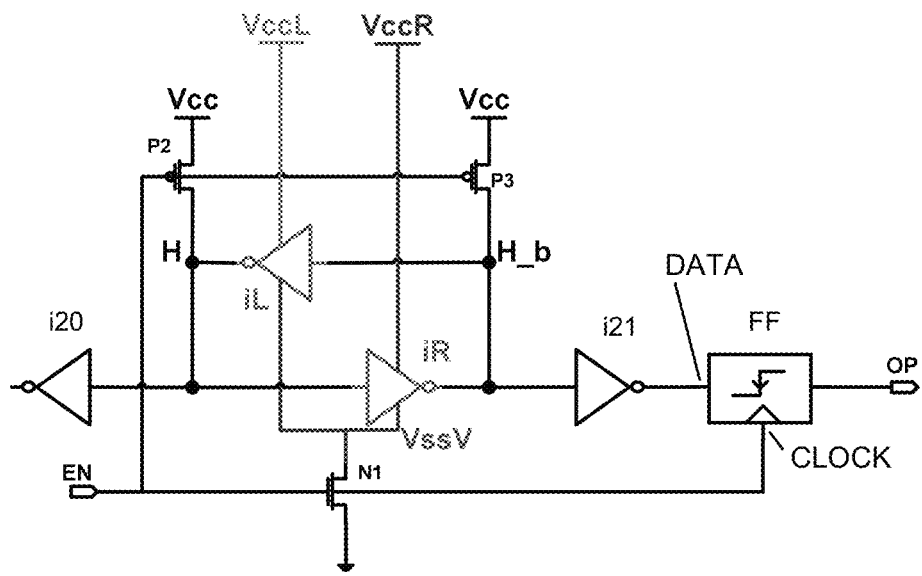
FIG. 3A is a simplified circuit diagram of a method of detecting unreliable bits, such as using PUF tilting to detect unreliable bits in calibration or in the field, in accordance with a non-limiting embodiment of the present invention.

Reference is now made to FIG. 3A, which illustrates a simplified circuit diagram of a method of detecting unreliable bits, such as using PUF tilting to detect unreliable bits in calibration or in the field, in accordance with a non-limiting embodiment of the present invention.

The novel tilting method can expose the unstable bits, either in calibration or in the field. Using this method, a biasing technique is applied to the PUF trip point, which pushes them in a given direction and forces them to trip. PUF bits which are very stable will be resilient to this biasing and will retain their original trip point. However, the unstable bits will be tripped, and can then be identified and eliminated from the algorithm.

The non-limiting circuitry of FIG. 3A is now described. In general, throughout the specification and claims, the term "connected" means a direct electrical connection between the things that are connected, without any intermediary devices. The term "coupled" means either a direct electrical connection between the things that are connected or an indirect connection through one or more passive or active intermediary devices. The term "circuit" or "circuitry" means one or more passive and/or active components that are arranged to cooperate with one another to provide a desired function. The term "signal" means at least one current signal, voltage signal or data/clock signal. The meaning of "a," "an," and "the" include plural references. The meaning of "in" includes "in" and "on." For purposes of the embodiments, the transistors are metal oxide semiconductor (MOS) transistors, which include drain, source, gate, and bulk terminals, but the transistors may include any device implementing transistor functionality, such as without limitation, bi-polar junction transistors—BJT PNP/NPN, BiCMOS, CMOS, eFET, etc. Note that the inverter elements shown in the schematics have an input and an output which are shown explicitly in the schematic, but there is also implied a positive supply terminal (Vcc) and a negative supply terminal (Vss) of the inverters. When the negative and positive supply terminals are not connected to anything, it is implied that the negative supply terminal is connected to Vss, the negative supply, while the positive supply terminal is connected to Vcc, the positive supply, as is known in the art. Some of the schematics show connections of the implied negative and positive supply terminals to different supplies.

In the circuitry of FIG. 3A, input EN is coupled via node A to the gate terminal of an NMOS transistor N1 and to the gate terminal of a PMOS transistor P2, and to the gate terminal of PMOS transistor P3. The source terminal of P2 is coupled to a voltage source Vcc. The drain terminal of P2 is coupled to a node H and from there to the output of an inverter iL and to the input of an inverter iR. The source terminal of N1 is coupled to ground and the drain terminal is coupled to a voltage source VssV and from there to the negative supply (Vss) terminal of inverter iR. An input of inverter iR is coupled to the output of an inverter i20. The VCC (positive supply) terminal of inverter iR is coupled to a voltage source VccR. The inverter iR outputs to the input of another (buffer) inverter i21. The output of inverter i21 is connected to the data terminal of a logic element (e.g., a flip-flop) FF, which may be used to record data and which outputs to output OP. The EN signal is connected to the CLK terminal of the FF.

The VSS terminal of inverter iL is coupled to VssV and the VCC terminal is coupled to a voltage source VccL. The input of inverter iL is coupled to node H_b and from there coupled to the input of inverter i21. The gate of P2 is coupled to the gate of a PMOS transistor P3. The source of P3 is coupled to voltage source Vcc and the drain is coupled to node H_b. P2 and P3 are keeper transistors.

Accordingly, FIG. 3A shows a modified PUF cell, where the supply voltages of the two inverters are split into VccL and VccR. There will be a small voltage difference between these two supplies such that:

$VccL = Vcc - \text{delta}$ $VccR = Vcc + \text{delta}$

The value of delta may be kept relatively small, for example, without limitation, less than 50 mV, so there is no need for level shifters. When this voltage difference is imposed, it will bias one side of the latch to a logic "1" and the other side to a logic "0". The value of delta can be assigned in either direction, positive or negative to impose either bias to the PUF, which will assist in extracting unstable bits. If, for example, delta is negative, then VccL>VccR. During the initial state when the cell is disabled, H and H_b are both high, but the inverter iL will have a stronger PMOS than iL, which will bias H to Vcc. In the other direction, for positive delta, VccR>VccL and H_b will be biased towards Vcc while H will be biased towards zero. In any case, tilting the PUF in either direction exposes the marginal bits.

It is noted that in FIG. 3A the two supplies VccL and VccR are applied to the inverters iR and iL. However, they can also be applied to the keeper transistors, P2 and P3 as well in addition to or instead of the inverters, and this will have a similar effect. It should be noted that the tilting can be applied to the entire PUF array simultaneously. In this manner the size of the individual PUF bits is not significantly affected by the imposition of two supply levels.

Figure 4A:
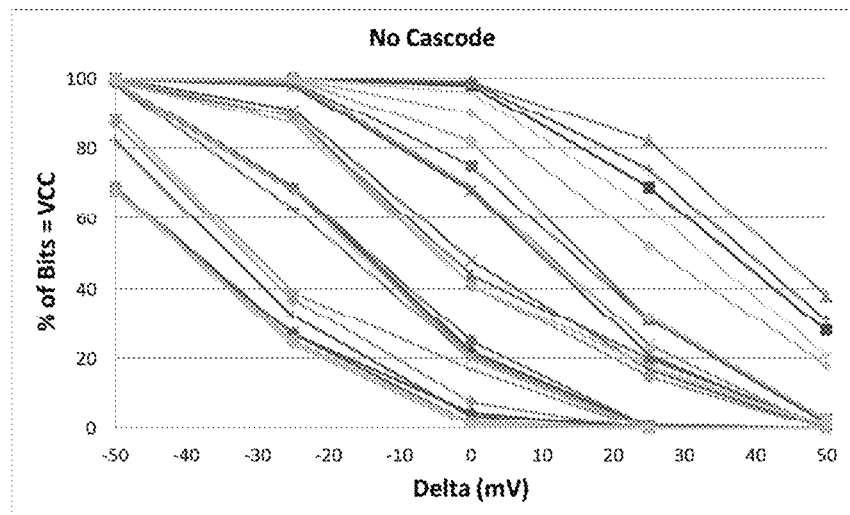
FIG. 4A is a graphical illustration of simulations of unstable bits using tilting (Vcc=0.8V, Temp=110, standard inverter (no cascode)—500 Splits Monte Carlo), in accordance with a non-limiting embodiment of the present invention, wherein the unstable bits had at least one transient noise run in opposite direction than the rest for delta=0, and all stable bits had 100% at "0" or 100% at "1" when delta=0.

The tilting method of the invention was tested, in which a transient noise simulation was done in Monte Carlo with 500 Monte Carlo splits. Each of these splits had 100 noise repetitions. This simulates the Monte Carlo of an array of 500 bits. FIG. 4A illustrates a plot of all of the unstable bits in the array (~6% in this corner) for delta=0. An unstable bit is defined as a bit which does not have all of the noise runs in the same direction. The Y axis plots the percentage of bits whose output (or node H in FIG. 3A) equals Vcc, vs. delta. One can easily see that a negative delta pulls the percentage to Vcc, while a positive delta pulls the percentage to Vss. Any bits that have a strong "0" for negative delta or a strong "1" for positive delta can be deemed valid. This can be done by using the standard TMV techniques for delta=±50 mV and disqualifying all unstable bits.

Figure 3B:
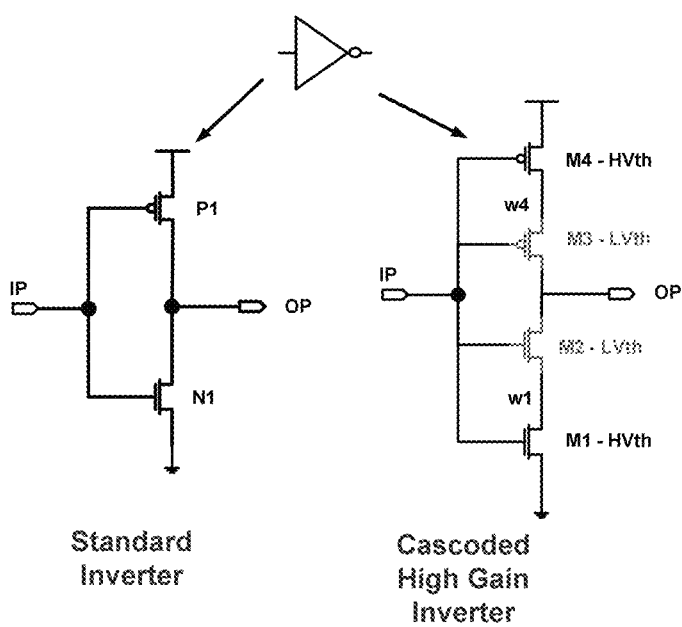
FIG. 3B is a simplified circuit diagram of a standard inverter and a high gain inverter, which may be used in the invention.

Another embodiment of the invention for improving the tilting is shown in FIG. 3B. In the previous embodiment, standard inverters were used to carry out the tilting. The standard inverter (left side of FIG. 3B) has an input IP that inputs to the gate of PMOS transistor P1 and the gate of NMOS transistor N1. The source of N1 is grounded whereas the drain of N1 and the drain of P1 are coupled via a node to the output OP. However, it is possible to replace the latching inverters (iL and iR in FIG. 3A) with cascoded high-gain inverters shown in the right inverter of FIG. 3B.

In the cascoded inverter of FIG. 3B, input IP inputs to the gates of PMOS transistors M4 and M3 and to the gates of NMOS transistors M1 and M2. The source of M1 is grounded. The source of M2 is coupled to the drain of M1. The drains of M2 and M3 are coupled to the output OP. The source of M3 is coupled to the drain of M4.

Accordingly, the right inverter of FIG. 3B utilizes a low-Vt (LVth) (Vt or Vth is the threshold voltage of the transistor) transistor stacked at the drain of a high-Vt (HVth) device to improve Rout. The improvement of Rout was proven in K. Luria, J. Shor, M. Zelikson, and A. Lyakhov, "Dual-Mode Low-Drop-Out Regulator/Power Gate With Linear and On-Off Conduction for Microprocessor Core On-Die Supply Voltages in 14 nm", IEEE Journal of Solid-State Circuits vol 51, no. 3, pp 752-762 (2016) to increase the gain by a large factor. In simulations carried out to test the invention in the reference by Luria, the standard inverter had a gain of 10-15, while the high-gain device had gains of 35-45.

Figure 4B:
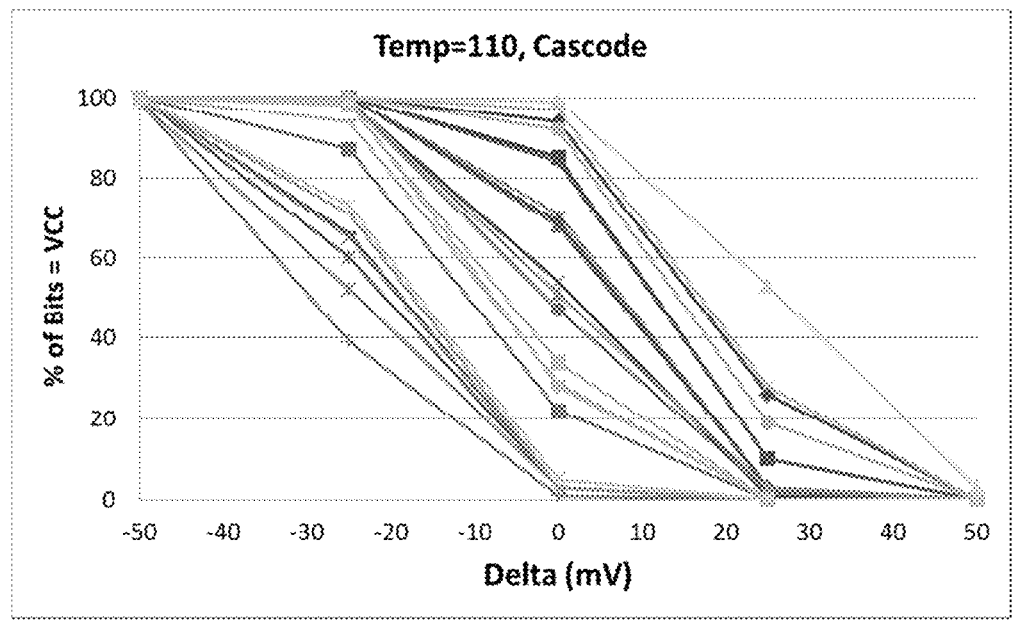
FIG. 4B is a graphical illustration of simulations of unstable bits using tilting for high gain cell (VCC=0.8, Temp=110, high gain cell (Cascoded PUF)–500 Splits), in accordance with a non-limiting embodiment of the present invention.

FIG. 4B shows the results of using tilting with a high gain latching inverters. In this case, the effectiveness of the tilting is much sharper. All of the flaky bits were tilted all of the way to one side with delta=−50 mV and +50 mV. We can also define a tilting slope, which is the slope of FIGS. 4A and 4B close to delta=0. For the standard inverters (FIG. 4A), the average tilting was 1.5%/mV, while the high-gain inverters (FIG. 4B) had an average tilting slope of 2.6%/mV.

Figure 5:
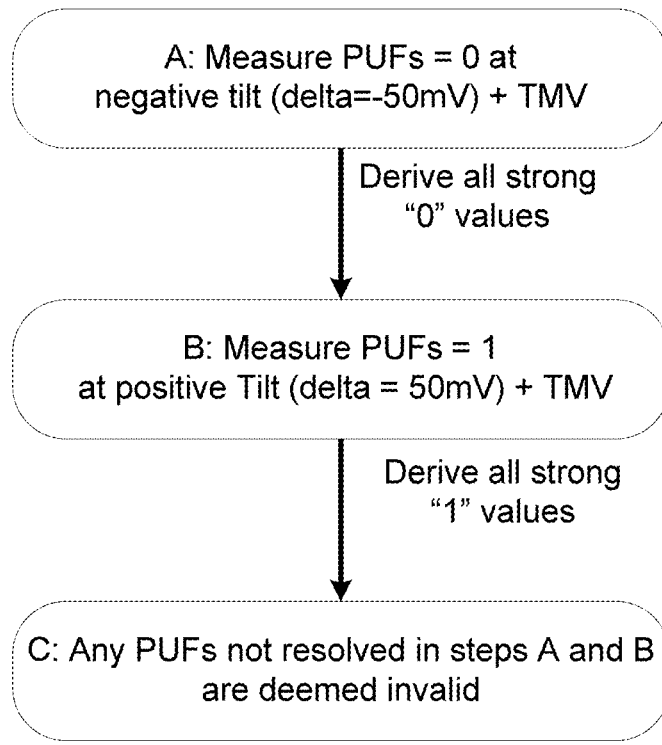
FIG. 5 is a simplified flowchart for disqualifying the unstable bits, in accordance with a non-limiting embodiment of the present invention.

Reference is now made to FIG. 5, which is a flowchart describing the method to eliminate the unreliable bits. In step A, all of the bits are measured at negative delta (delta=−50 mV) and TMV, and the bits which are "0" 80% of the time are identified. In step B, a positive tilt (delta=50 mV) and TMV are applied and the "1" bits are located. Any bits not identified in steps A and B are deemed invalid. This flow was applied to a transient noise simulation of 200 PUF bits in 4 process corners: Vcc=0.8, 1.1V and temperature=−10, 110. All of the unstable bits were recorded in all of the corners, and 19 unstable bits were found. The tilting technique using high gain inverters was applied in one of the corners with delta=+−50 mV. 12.5% of the array was disqualified, including all of the unstable bits, proving the effectiveness of the technique for screening.

It should be noted that the differential supply voltage applied to the PUF can be considered a controllable physical parameter which affects the digital code of the PUF. If the controllable physical parameter (e.g., the differential supply voltage) is applied (or tilted) in one direction, the PUF is biased one way; conversely, if the controllable physical parameter is applied in a second direction, the PUF is biased another way. The resulting digital code of the PUF is a direct result of this bias. By tilting the PUF using this controllable physical parameter, the amount of inherent variation in the PUF can be determined and the cells without sufficient variation can be exposed.

Figure 6:
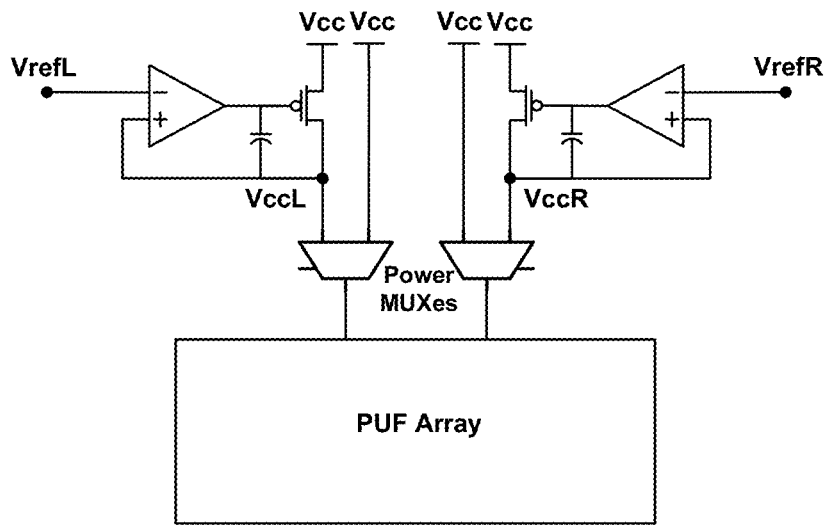
FIG. 6 is a simplified circuit diagram of a PUF Array+ LDO's, in accordance with a non-limiting embodiment of the present invention, wherein the tilting technique can also be done in the field, and not just during IC calibration.

Reference is now made to FIG. 6, which shows tilting PUFs with integrated LDO's (Low Drop-Out Regulators). An LDO is a linear voltage regulator which provides an exact supply voltage from a variable supply voltage. The LDO's can enable the application of an accurate controlled supply to the chip, and thus enable features such as "tilting". These LDO's can be placed on-die, which enables the tilting technique to be applied in the field during actual operation, rather than just during calibration, when a number of external voltages may be available.

Figure 7:
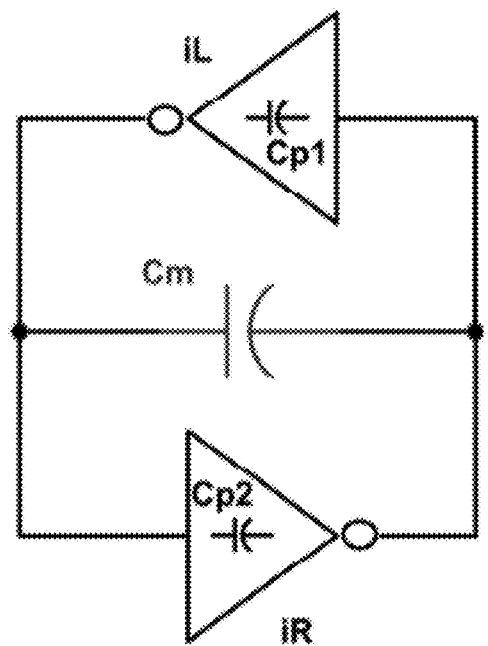
FIG. 7 is a more detailed circuit diagram of the two inverters of FIG. 3A or 3B, in accordance with a non-limiting embodiment of the present invention, wherein a Miller capacitor Cm is placed between the inverters, and the Miller capacitor neutralizes the mismatch effects of the internal parasitics of the two inverters.

Reference is now made to FIG. 7, which shows another embodiment which can make the SRAM PUF more reliable. FIG. 7 illustrates the two SRAM inverters from FIG. 3B without any of the other circuitry. During the simulation of the PUF it was found that even with tilting, some of the PUF cells would switch states for different VCC levels. This is caused by increased speed of the transition which occurs at higher VCC levels. At very high speeds, the mismatch between the parasitic gate capacitances can become dominant in some of the cells and overcome the normal transconductance and Vth based mismatch. The parasitic capacitance effects can cause the cells to become unstable between corners, so it is desirable to eliminate the parasitic capacitance effects. In order to accomplish this, a small metal capacitor Cm may be placed between the inputs of the two inverters. This can be a metal-finger cap, whose value, without limitation, can be in the range of 10 fF. The Miller effect causes a capacitance multiplication at the input of the inverters such that:

$$C_{eq}=(1+A_v)*C_m$$

Thus, the presence of this Miller capacitor dominates any other parasitic effects and makes the effect of tilting more pronounced. It can be combined with tilting, or can be implemented alone. It should be noted that for the purposes of this invention a Miller capacitor is defined as any capacitor placed between the input and output of a gain element, such as a CMOS inverter.

Referring again to the differential supply voltage, the supply voltage rail is defined as a generated supply which supplies a voltage, either the positive or negative rail to the chip. A differential supply voltage or differential supply voltage rail refers to the case where there are two positive supply voltages or two negative supply voltages in the chip, and a small difference in the voltages can be implemented. In systems on chip (SOCs), there are generally two or more positive supply voltages which can easily be manipulated during testing. As these supply voltages already exist, it is easier to use them for tilting than generating an analog bias or using an LDO.

Figure 8:
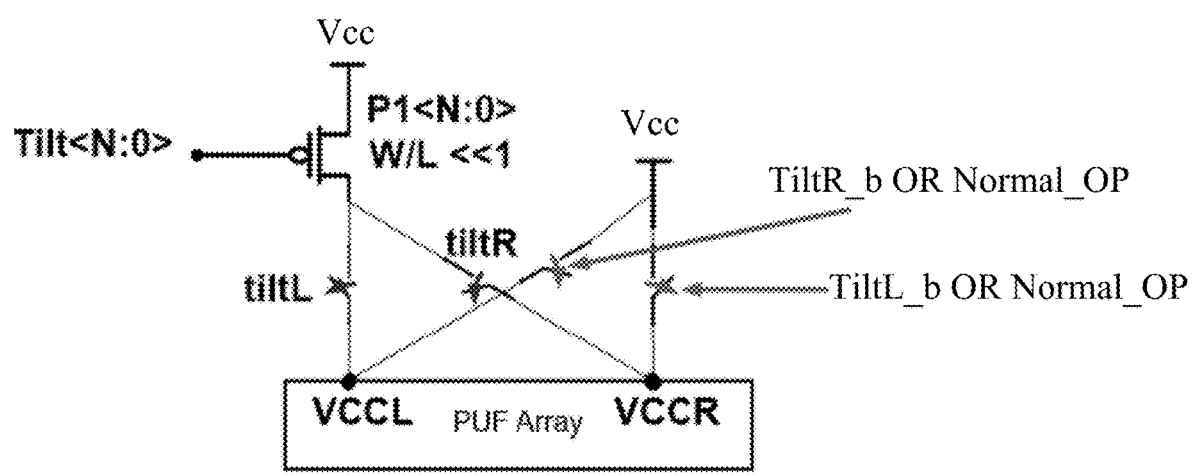
FIG. 8 is a simplified circuit diagram of a circuit to generate a differential supply voltage across the PUF array in accordance with an embodiment of the invention.

In the case where there is only one positive supply voltage, FIG. 8 illustrates a novel circuit to generate a differential supply voltage across the PUF array.

The source terminal of a PMOS transistor array P1(N:0) is coupled to a voltage Vcc. The gate terminal is coupled to a corresponding bus Tilt(N:0). The drain terminal is coupled to VccL of the PUF array (of any of the embodiments of the invention) via a switch tiltL and to VccR of the PUF array via a switch tiltR. Another Vcc input is coupled to VccL via a switch TiltR_b and to VccR via a switch TiltL_b.

The logical values of switches TiltR_b and TiltL_b are as follows:

TiltR_b=NOT(TiltR) OR Normal_OP
TiltL_b=NOT(TiltL) OR Normal_OP

During normal operation (Normal_OP) where the PUF is read with non-tilting, the TiltR_b and TiltL_b switches are conducting, while TiltL and TiltR switches are non-conducting.

During Tilt Left, the switches TiltL and TiltL_b are conducting while TiltR and TiltR_b are non-conducting.

During Tilt Right, the switches TiltR and TiltR_b are conducting, while TiltL and TiltL_b are non-conducting.

The PMOS transistor array P1(N:0) is comprised of weak PMOS devices, meaning each has a small W/L ratio (ratio of channel width to channel length), which means its resistance is high and its ability to pass current is weak. A non-limiting example is W/L ratio less than or equal to 0.02 (e.g., W=200 nm, L=10 μm); in another embodiment, the W/L ratio less than or equal to 0.05 (e.g., W=500 nm, L=10 μm); in another embodiment, the W/L ratio less than or equal to 0.10 (e.g., W=500 nm, L=5 μm).

The circuit of FIG. 8 uses the self-current of the PUF array to generate a resistive drop across the weak PMOS devices, which acts as a resistor. This resistive drop generates the voltage difference, delta, between VCCL and VCCR. The PMOS device is programmable, so the amount of legs or pins (N) can be controlled digitally by the bus Tilt(N:0) to vary delta.

To mitigate the cost implications of extra pins, existing supply pins may be reused during the tilt test to inject the tilt delta. Usually, there are several Vdd voltages available in SOC's, and different Vdd's can be used in a testing configuration to implement the tilt. During normal operation, the configuration would connect the same Vdd to both VccL and VccR. The preselection and normal operation modes could be programmed into a configuration register on the chip.

Alternatively, the differential voltage can be generated on die by utilizing the circuit of FIG. 8. A series of weak power gates (of transistor P1) are implemented, such that the IR drop over them is programmable and is used as the tilt delta. During tilting, either VccL or VccR is driven by the weak power-gate (through one of the switches tiltL or tiltR), while the other one is strongly driven to Vcc (through one of the switches TiltR_b or TiltL_b which are strong power-gates). During normal operation, both VccL and VccR are driven strongly to Vcc by the switches TiltR_b and TiltL_b. The self-current of the PUF array generates the IR drop across transistor array P1(N:0) during tilting. This type of configuration could be done during enrollment by the customer and could be controlled by configuration registers.

What is claimed is:

1. A method for detecting unreliable bits in transistor circuitry comprising:
applying a controllable physical parameter to a transistor circuitry, thereby causing a variation in a digital code of a cryptologic element in the transistor circuitry, said cryptologic element comprising a physical unclonable function (PUF), wherein said PUF has at least one cell and wherein said controllable physical parameter is capable of being tilted in one direction to bias said at least one cell towards a zero state and is capable of being tilted in another direction to bias said at least one cell towards a one state, and wherein the variation is a tilt or bias towards the zero state or towards the one state;
determining an amount of variation in the digital code of the cryptologic element; and establishing unreliable bits in the transistor circuitry as being those bits for which said variation is in a range defined as unreliable and wherein said controllable physical parameter comprises a differential voltage generated by a voltage difference between two different positive supply voltages or two different negative supply voltages.

2. The method according to claim 1, wherein said at least one cell is considered a stable cell if when it is tilted towards the zero state and when it is tilted towards the one state it does not change its state, and is considered an unstable cell if when it is tilted towards the zero or towards the one state, it changes its state in the direction of the tilting.

3. The method according to claim 1, comprising applying the differential supply voltage to supplies of at least one cell in the transistor circuitry.

4. The method according to claim 1, comprising applying the differential supply voltage simultaneously to an entire array of cells in the transistor circuitry.

5. The method according to claim 1, wherein said PUF is a static random-access memory (SRAM) PUF.

6. The method according to claim 1, wherein the differential supply voltage is applied between supplies of inverters connected in a criss-cross or latching manner, wherein an input of a first inverter is connected to an output of a second inverter and an input of the second inverter is connected to an output of the first inverter.

7. The method according to claim 6, wherein said inverters comprise cascoded inverters.

8. The method according to claim 7, wherein said cascoded inverters comprise NMOS transistors M1 and M2, PMOS transistors M3 and M4 and input IP and an output OP, and wherein input IP inputs to gates of PMOS transistors M4 and M3 and to gates of NMOS transistors M1 and M2, a source of M1 is grounded, a source of M2 is coupled to a drain of M1, drains of M2 and M3 are coupled to the output OP and a source of M3 is coupled to a drain of M4, and M1 and M4 are higher threshold voltage transistors, while M2 and M3 are lower threshold voltage transistors.

9. The method according to claim 1, wherein said transistor circuitry comprises an input EN, an NMOS transistor N1, a PMOS transistor P2, a PMOS transistor P3, a voltage source Vcc, an inverter iL, an inverter iR, a voltage source VssV and a voltage source VccL,
wherein input EN is coupled via node A to a gate terminal of the NMOS transistor N1 and to a gate terminal of the PMOS transistor P2 and to a gate terminal of the PMOS transistor P3, and wherein a source terminal of the transistor P2 is coupled to a voltage source Vcc, a drain terminal of the transistor P2 is coupled to a node H and the node H is also coupled to an output of the inverter iL and to an input of the inverter iR, and wherein a source terminal of the transistor N1 is coupled to ground and a drain terminal is coupled to the voltage source VssV and from there to a negative supply terminal of the inverter iR, and wherein a negative supply terminal of the inverter iL is coupled to the voltage source VssV and a positive supply terminal of the inverter iL is coupled to the voltage source VccL and an input of the inverter iL is coupled to a node H_b, and an output of the inverter iR is coupled to the node H_b and a source of the transistor P3 is coupled to the voltage source Vcc and a drain of the transistor P3 is coupled to the node H_b.

10. The method according to claim 9, wherein said transistor circuitry further comprises a voltage source VccR, a logic element, an output OP, an inverter i20 and a buffer inverter i21, and wherein an output of the inverter iL is coupled to an input of the inverter i20 and the positive supply of the inverter iR is coupled to the voltage source VccR and the inverter iR outputs to an input of the buffer inverter i21 and an output of the buffer inverter i21 is connected to the data terminal of said logic element which outputs to the output OP, while the CLK terminal of the logic element connects to the EN signal.

11. The method according to claim 1, wherein an initial off state of a cell in the transistor circuitry is held by keeper transistors and said differential supply voltage is applied between said keeper transistors.

12. The method according to claim 1, wherein a Miller capacitor is placed between inputs of two inverters in the transistor circuitry.

13. The method according to claim 1, wherein applying the controllable physical parameter to the transistor circuitry comprises controlling supply voltages of cells in the transistor circuitry with one or more Low Drop-Out Regulators.

14. The method according to claim 1, wherein the differential voltage is generated by a resistive drop across at least one MOSFET device.

15. The method according to claim 14, wherein the current causing the resistive drop across the at least one MOSFET device is the self-current of the PUF.

16. The method according to claim 14, wherein the at least one MOSFET is a programmable array of MOSFET devices such that the resistive drop is controllable.

* * * * *